United States Patent [19]

Hartmann et al.

[11] 4,218,324

[45] Aug. 19, 1980

[54] FILTER ELEMENT HAVING REMOVABLE FILTER MEDIA MEMBER

[75] Inventors: Wilhelm U. Hartmann, Sepulveda; Larry C. Augustine, Saugus, both of Calif.; Daniel J. Ryan, Tuckerton, N.J.

[73] Assignee: Textron, Inc., Providence, R.I.

[21] Appl. No.: 35,670

[22] Filed: May 3, 1979

[51] Int. Cl.$^2$ .................... B01D 27/06; B01D 29/06
[52] U.S. Cl. ................................................ 210/493 R
[58] Field of Search ............... 210/232, 435, 450, 451, 210/452, 455, 457, 459, 460–464, 493 R; 55/379, 492, 502, 503

[56] References Cited

U.S. PATENT DOCUMENTS

| 1,908,362 | 5/1933 | Jacobs et al. | 210/460 |
| 3,023,905 | 3/1962 | McDougal et al. | 210/460 |
| 3,218,785 | 11/1965 | Tietz | 55/503 |

Primary Examiner—Frank Sever
Attorney, Agent, or Firm—Nilsson, Robbins, Dalgarn, Berliner, Carson & Wurst

[57] ABSTRACT

A metallic filter element constructed of stainless steel. The filter element includes a tubular metal support member having a tubular filter media member slipped over the support member. When the filter element becomes clogged and is ready for cleaning or becomes damaged and is ready for replacement, the filter media member may be easily removed by merely slipping it off the tubular metal support member and replacing it with a new or cleaned filter media member.

13 Claims, 4 Drawing Figures

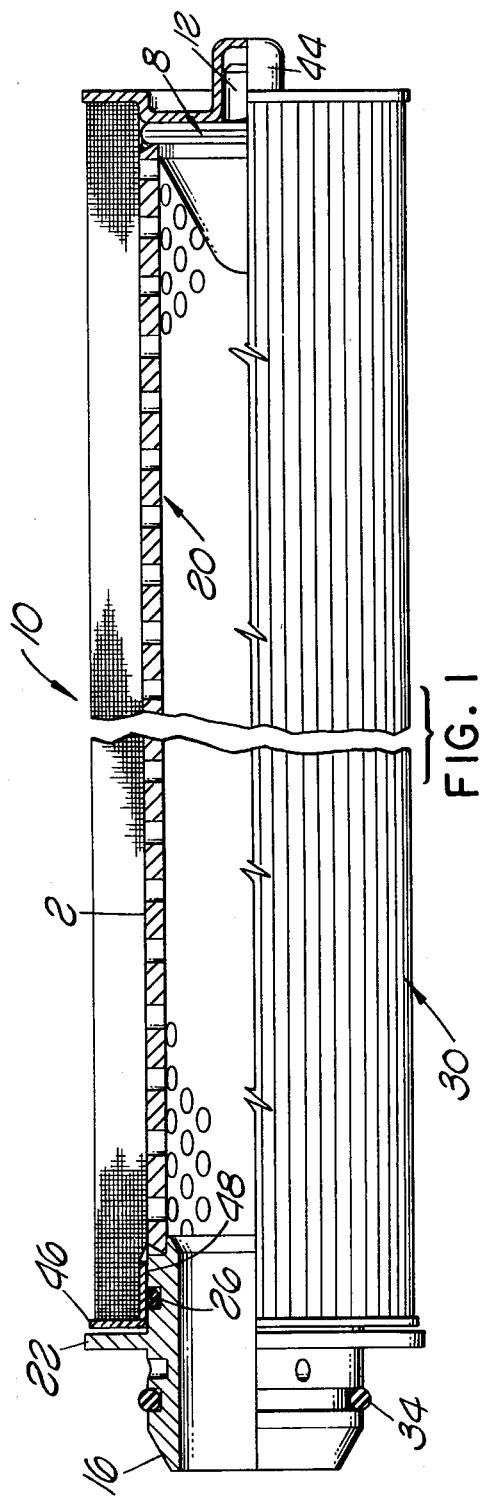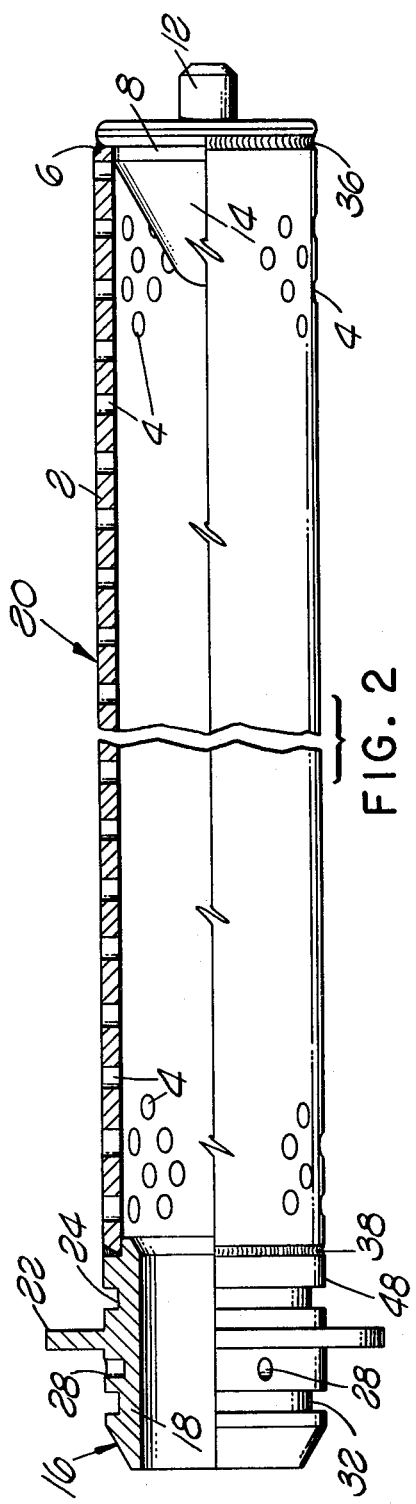

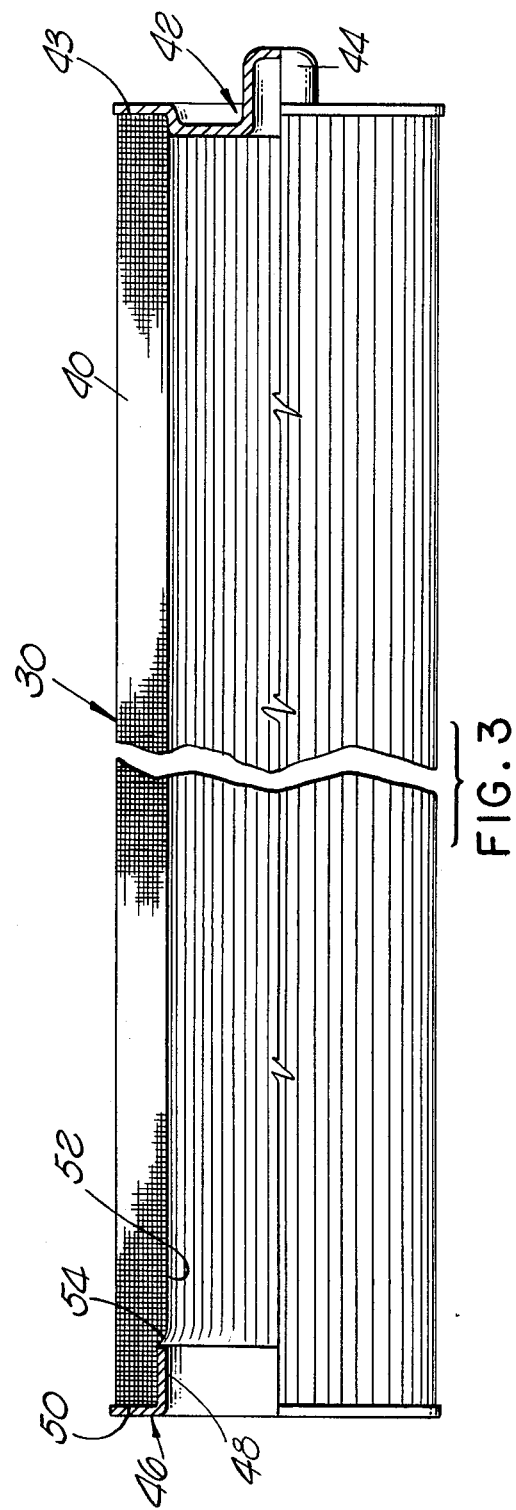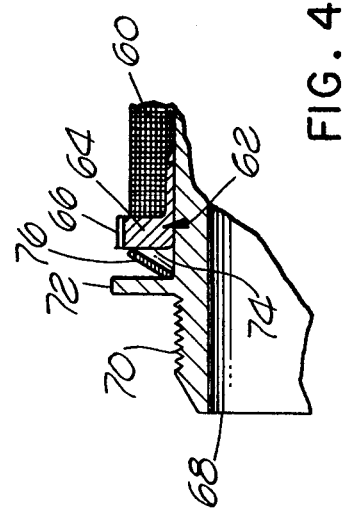

FILTER ELEMENT HAVING REMOVABLE FILTER MEDIA MEMBER

BACKGROUND OF THE INVENTION

In the prior art of filtering highly corrosive materials at high temperatures and pressures, it has been customary to remove the entire filter element, including the tubular support member as well as the filter media member for cleaning or replacement. Such has been required because the filter element has been constructed as an integral unit with the filter media member permanently affixed to the tubular metal support member.

When the filter element required replacement, it was necessary to replace it with a completed filter element including the metal support and filter media member permanently attached thereto, even though only the filter media member was damaged or otherwise rendered inoperative.

When the prior art filter element was to be cleaned, the interface between the filter media member and the metal support member could not be directly reached during the cleaning process and as a result cleaning required a long period of time and did not always fully clean the filter element, thereby reducing the overall number of times the filter element could be cleaned and thus the life of the filter element.

The best known prior art are U.S. Pats. Nos. 3,312,349 and 3,750,889.

SUMMARY OF THE INVENTION

A metallic filter element for fine filtration under adverse operating conditions which may be readily disassembled for cleaning and replacement of component parts including a tubular metal support member having a tubular pleated filter media member slipped over said support member and means for removably sealing the media member to the support member.

BRIEF DESCRIPTION OF THE DRAWINGS

FIG. 1 is a plan view, partly in section, of a filter element constructed in accordance with the present invention;

FIG. 2 is a plan view, partly in cross section, of the support member portion of the filter element of the present invention;

FIG. 3 is a plan view, partly in cross section, of the metallic filter media portion of the filter element of the present invention; and FIG. 4 is a plan view, partly in cross section, of an alternative embodiment of a filter element constructed in accordance with the principles of the present invention.

DETAILED DESCRIPTION OF THE INVENTION

The filter element constructed in accordance with the principles of the present invention is illustrated in FIG. 1 in its fully assembled form. As is therein shown, the filter element 10 includes a support tube 20 upon which there has been slipped a filter media member 30. As will be noted from FIG. 1, the filter media member 30 is not directly secured to the support tube 20. Instead the filter media member 30 is merely slipped over the tube 20 in such a manner that it may be simply slipped off the tube 20 at the time of disassembly for cleaning or for replacement of the filter media member 30. As will be readily recognized by those skilled in the art, the assembly as shown in FIG. 1 would, along with similar assemblies, be disposed within an appropriate chamber between support and header plates for normal operation.

By reference now to FIG. 2, a better understanding of the detailed construction of the support member 20 may be realized. The support member 20 includes a metal tube 2 constructed from a corrosion resistant metal, such for example as 316 CRES stainless steel. The metal tube 2 is perforated throughout its entire area as illustrated by the openings 4 to allow the passage of fluid which is filtered therethrough. One end 6 of the metal tube 2 is closed by an end plug 8 which includes a protrusion 12 extending outwardly therefrom and disposed centrally axially thereon. The end plug 8 also includes a body 14 having a generally conical configuration. Such configuration as is known to those skilled in the art is to prevent the formation of stagnant flow areas within the interior of the tube 2.

At the opposite end of the tube 2 there is provided an end fitting 16. The end fitting 16 includes a body 18 having a flange 22 radially outwardly extending therefrom. The body 18 defines a groove 24 within which an O-ring 26 (FIG. 1) is seated to provide a seal between the support member 20 and the filter media member 30 thereby to preclude fluid bypassing the filter media member 30. Tool receiving means such as the openings 28 defined by the body 18 are provided for the purpose of assisting in manipulation of the filter element and the support member with respect to the filter media member during assembly and disassembly operations. An additional groove 32 is also provided in the body 18 to receive an O-ring 34 (FIG. 1) for purposes of sealing the fitting 16 to a header plate (not shown) during operation of a filter utilizing the filter element of the present invention. The end plug 8 and the end fitting 16 are permanently affixed to the metal tube 2 such as by welding as shown at 36 and 38, respectively.

By reference now to FIG. 3, the filter media member may be seen in greater detail. As is therein shown the filter media member includes a tubular pleated filter media 40 constructed of a plurality of randomly disposed metallic fibers which have been sintered. Such a filter media is well known in the art and may be constructed in accordance with the teachings of U.S. Pat. No. 3,504,422, which is incorporated herein by reference. By way of summary only, the disclosure of said patent generally teaches that metallic fibers having a cross sectional area to provide the desired absolute filter rating for the media are formed into an air-laid web and thereafter are processed by compression and sintering to form a felted cloth material. This material may then be placed between woven wire to provide additional support and the combination thereafter pleated and formed into a circular, tubular configuration as shown in FIG. 3.

A media end cap 42 is secured to a first end 43 of the media 40, such for example as by brazing or welding. The cap 42 includes a hollow boss 44 which is adapted to receive the protrusion 12 (FIG. 2) on the end plug 8, thus maintaining appropriate alignment between the filter media member 30 and the support member 20 to prevent distortion of the media member 30 from the support member 20 due to side loads.

A ring shaped metal band 46 generally L-shaped in cross section and defining a sealing surface 48 is permanently secured to the opposite end 50 of the filter media 40, such as by welding or brazing. It will be noted that the inner surface 52 of the filter media 40 is compressed inwardly as shown at 54 in receiving metal band 46 so as to maintain radial alignment between the surface 48 and the surface 52. The sealing surface 48 cooperates with the O-ring 26 to preclude leakage of the fluid around the filter media 40.

By reference again to FIG. 1 and to the detailed configuration as disclosed and described with respect to FIGS. 2 and 3, those skilled in the art will now recognize more clearly that the filter media member 30 is slipped over the outer surface of the support member 20 so that the band 46 is positioned adjacent to the flange 22 by causing the protrusion 12 to be seated within the hollow boss 44 thereby allowing the sealing surface 48 to contact and compress the O-ring 26 within the groove 24. It will be recognized by those skilled in the art that effectively the filter media member 30 is floating upon the support member 20, that is there is no connection such as screw threads, clamps or the like to prevent longitudinal movement between the support member 20 and the filter media member 30.

The filter element is next disposed within the filter chamber between a support plate and a header to as to properly position the same to receive the fluid to be filtered. As the fluid is introduced into the filter chamber and passed through the filter element as constructed in accordance with the present invention, the differential pressure across the filter element (the fluid being filtered flows from outside to inside) is such that the floating filter media member is held firmly in place upon the support member 20 and is in fact urged toward the flange 22 by such pressure. Thus during operation of the filter element constructed in accordance with the present invention is firmly sealed without the utilization of various types of mechanical seals such as screw threads and the like which have been relied upon in the past.

Through utilization of this free floating technique between the filter media 30 and the support member 20, various severe problems caused by the large temperature changes which occur in filter elements utilized in the extreme environmental conditions above referred to have been eliminated. In the prior art, such items as a metal-to-metal seal, threaded areas and the like utilized to obtain the required seals for proper operation would be ineffective at some temperatures and often would cause binding or galling upon cycling of the filter elements at the relatively high temperatures. Through utilization of this free floating concept the synergistic effect of obtaining an excellent seal but at the same time allowing the filter media member to easily slip on and off the support member, irrespective of extremely hostile environmental conditions, has been achieved.

By reference to FIG. 4, there is illustrated an alternative embodiment of a structure constructed in accordance with the principles of the present invention illustrated in fragmentary, cross sectional view. The structure as illustrated in FIG. 4 is particularly useful in extremely high temperature applications, for example, in excess of 500° F. As is illustrated in FIG. 4, the filter media 60 would have the metal band 62 permanently affixed thereto. The metal band would include an enlarged end portion 64, the outer surface of which would define flats such as illustrated at 66 to receive hand tools for utilization in the assembly and disassembly operations as above described. The end fitting 68 on the support tube would be threaded as illustrated at 70 for assembly into the header plate. Positioned between the flange 72 and the sealing surface 74 would be a sealing member 76, for example, in the form of a Belleville washer. As above noted, the filter media member would still remain floating and as the fluid to be filtered was introduced the differential pressure would move the filter member toward the flange 72 thereby further applying a pressure to the Belleville washer 76 thus sealing the filter media member to the support member.

What is claimed is:

1. A stainless steel metallic filter element for filtering corrosive materials at relatively high pressures which element may be readily disassembled for cleaning and replacement of component parts thereof comprising:
   (A) a perforated tubular metal support member having one end closed;
   (B) a fitting having a body and a radially outwardly extending flange permanently attached to the other end of said support member;
   (C) a tubular pleated filter media member formed of stainless steel metallic material slipped over and extending along the length of said support member and in close contact therewith but with no physical retention means between said one diameter and said support member; and
   (D) means for removably sealing said media member to said support member.

2. A metallic filter element as defined in claim 1 wherein said filter media member is freely floating upon said support member.

3. A metallic filter element as defined in claim 2 wherein said filter media member has one end thereof permanently closed.

4. A metallic filter element as defined in claim 3 wherein said closed end is formed by an end cap permanently secured to said filter media member.

5. A metallic filter element as defined in claim 4 wherein said end cap includes a centrally disposed outwardly extending hollow boss.

6. A metallic filter element as defined in claim 5 wherein said closed end of said support member includes an outwardly extending protrusion for insertion into said hollow boss.

7. A metallic filter element as defined in claim 3 wherein the opposite end of said filter media member includes a ring shaped solid metal band permanently secured thereto.

8. A metallic filter element as defined in claim 7 wherein said metal band has an outer surface defining areas for receiving tools to assist in removing said media member from said support member.

9. A metallic filter member as defined in claim 1 wherein said means for sealing includes a ring shaped solid metal band permanently secured to one end of said filter media member and defining a sealing surface, said sealing surface engaging a sealing ring disposed between said sealing surface and said fitting.

10. A metallic filter element as defined in claim 9 wherein said sealing ring is an "O" ring.

11. A metallic filter element as defined in claim 9 wherein said sealing ring is an "O" ring disposed in said body.

12. A metallic filter element as defined in claim 9 wherein said sealing ring is a metal member.

13. A metallic filter element as defined in claim 12 wherein said metal member is a Belleville washer disposed between said sealing surface and said flange.

* * * * *

UNITED STATES PATENT AND TRADEMARK OFFICE
CERTIFICATE OF CORRECTION

PATENT NO. : 4,218,324
DATED : August 19, 1980
INVENTOR(S) : Wilhelm U. Hartmann et al It is certified that error appears in the above-identified patent and that said Letters Patent are hereby corrected as shown below:

Column 4, line 23, delete "one diameter" and insert
-- media member --.

Signed and Sealed this

Fourteenth Day of July 1981

[SEAL]

Attest:

GERALD J. MOSSINGHOFF

Attesting Officer

Commissioner of Patents and Trademarks